INVENTOR.
GEORGE BANKO

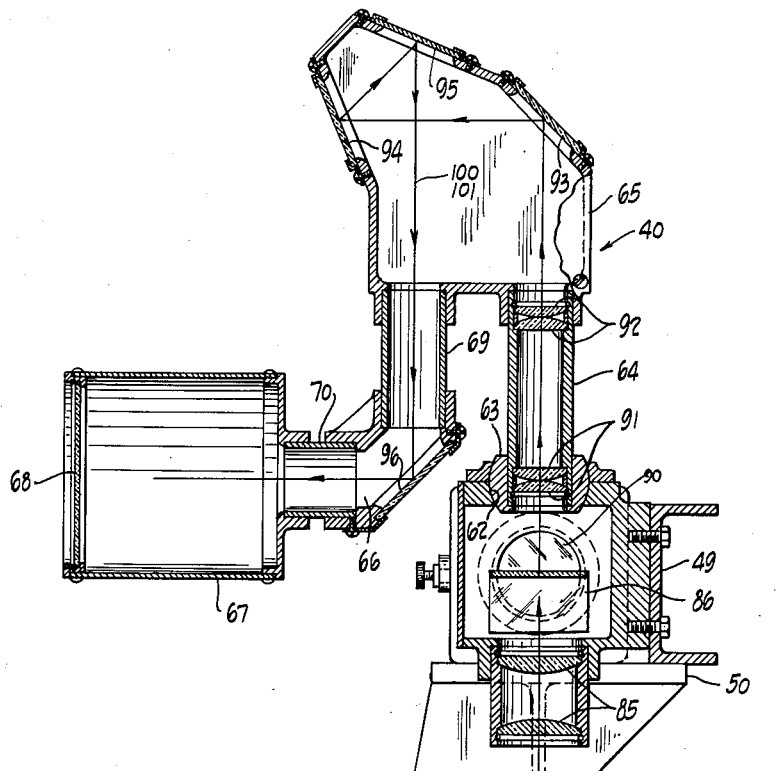
Fig. 4
INVENTOR.
GEORGE BANKO
BY
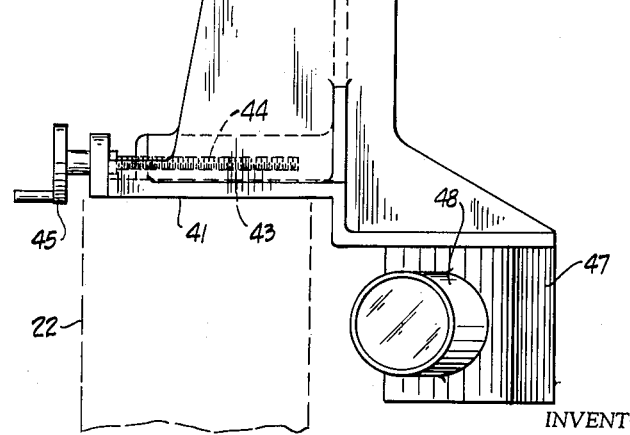
ATTORNEY.

June 19, 1962  G. BANKO  3,039,238
OPTICAL VIEWER FOR CYLINDRICAL GRINDING MACHINES
Filed March 7, 1960  6 Sheets-Sheet 6

INVENTOR.
GEORGE BANKO
BY
Sanford Schnurmacher
ATTORNEY.

United States Patent Office 3,039,238
Patented June 19, 1962

3,039,238
OPTICAL VIEWER FOR CYLINDRICAL GRINDING MACHINES
George Banko, 1834 E. 223rd St., Euclid, Ohio
Filed Mar. 7, 1960, Ser. No. 13,036
5 Claims. (Cl. 51—165)

This invention relates to optical comparators and particularly to such a viewer for an operating cylindrical grinding machine.

The primary object of this invention is to provide an inspection viewer for an operational cylindrical grinding machine which simultaneously projects in superposed relationship onto a viewing screen the images of the workpiece as it is being shaped by the grinder and the outline of a reference specimen or replica, at a scale 1:1 with reference to the workpiece, said projected images being formed directly through a same and single projector lens.

Another object is to provide a device of the type stated having its projector lens tiltably mounted at a nodal point, whereby the length and width of the superposed images may be scanned.

These and other objects of the invention will become apparent from a reading of the following specification and claims, together with the accompanying drawings in which like parts are referred to and indicated by like reference numerals, and wherein:

FIGURE 4 is a vertical sectional view taken along the line and in the direction of the arrows 4—4 of FIGURE 3;

Figure 1:
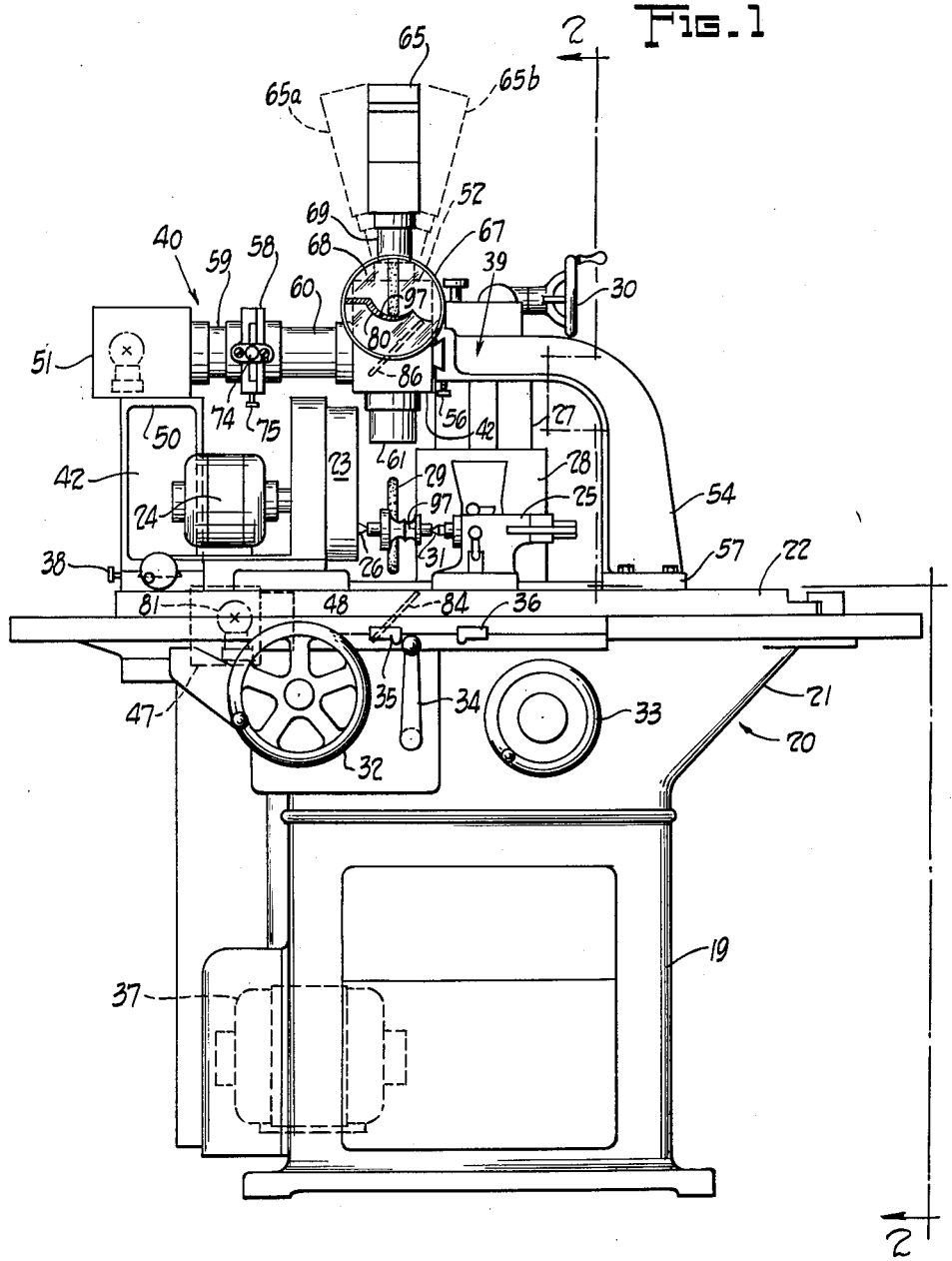
FIGURE 1 is a front elevation of the optical viewer that is the subject of this invention, mounted on a conventional cylindrical grinding machine.
Figure 2:
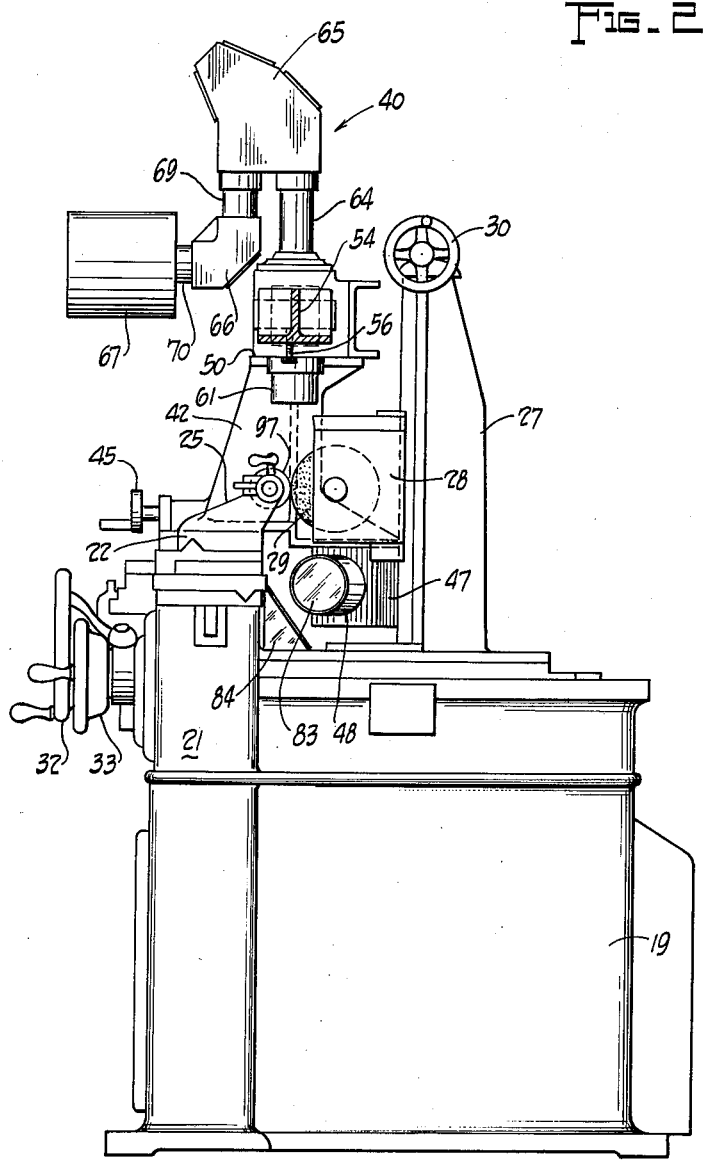
FIGURE 2 is a right end view of the same, with portions broken away and in section, taken along the line and in the direction of the arrows 2—2 of FIGURE 1.
Figure 3:
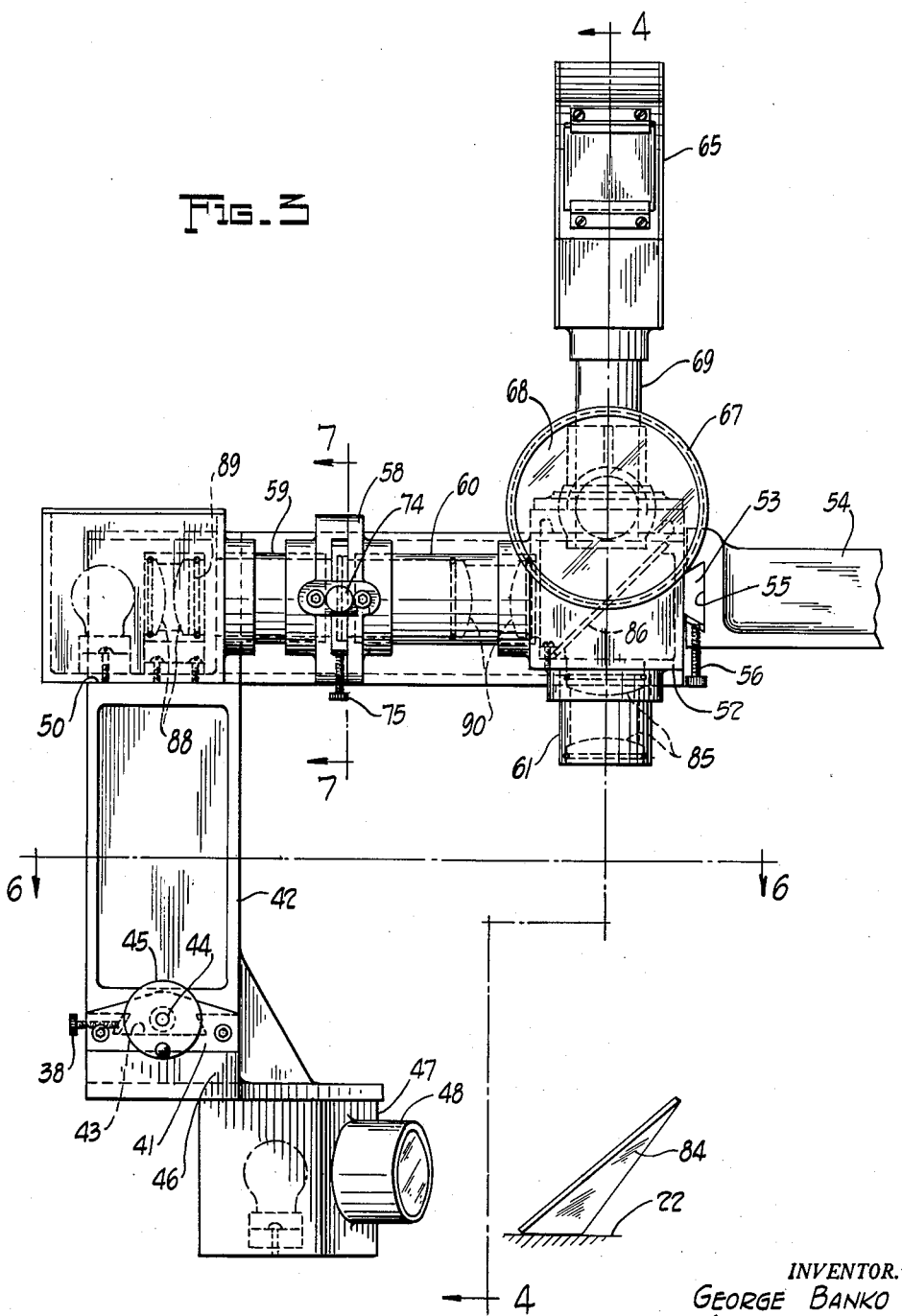
FIGURE 3 is an enlarged front elevation of the optical viewer with a portion of the right end support arm broken away.
Figure 5:
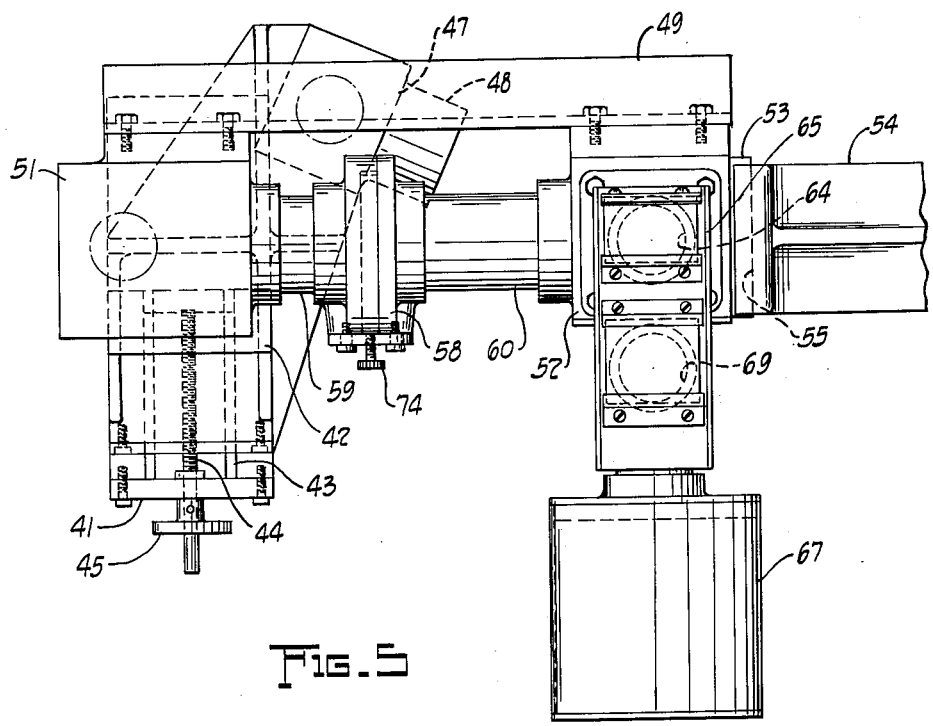
FIGURE 5 is a top plan view with the right end support arm broken away.
Figure 6:
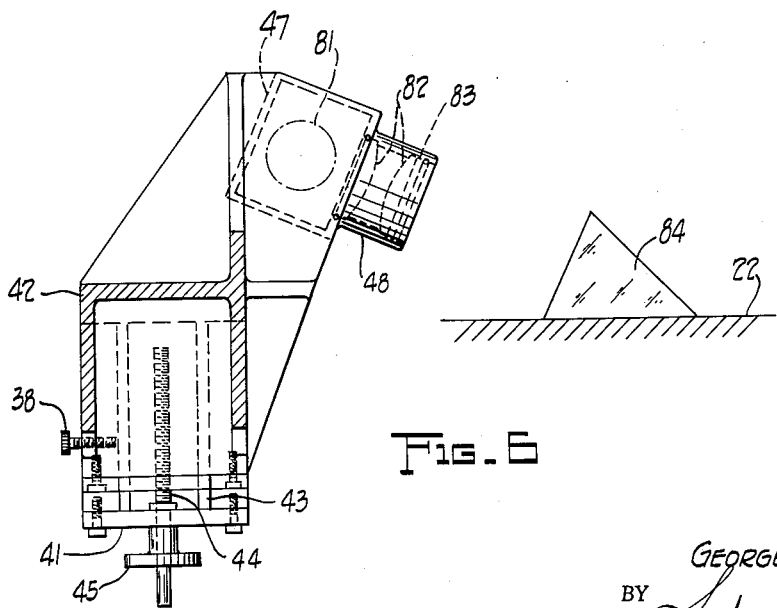
FIGURE 6 is a horizontal view, partly in section, taken along and in the direction of the arrows 6—6 of FIGURE 3.

Referring more particularly to the drawings, the instant invention consists of the combination of an operational cylindrical grinding machine 20 with an optical viewer, broadly indicated by reference numeral 40, mounted on the table 22 thereof, as seen in FIGURES 1 and 2.

The structure, broadly indicated by reference numeral 20, used for the purpose of illustration in FIGURES 1 and 2, is a conventional cylindrical grinding machine having a base 19 and a bed 21 upon which a sliding table 22 is supported.

Reference numerals 23 and 25 indicate head and foot stocks, respectively, mounted on the table 22. The headstock spindle is driven by a motor 24 and the workpiece 97, to be shaped, is held and rotated between the headstock and footstock centers 26 and 31, respectively.

Reference numerals 32 and 33 indicate hand wheels controlling the table feed and cross feed, respectively, while the tabel reversing lever and its associated stops are indicated by reference numerals 34 and 35—36, respectively.

Reference numeral 27 indicates the upright post which carries the vertically movable slide 28 on which the grinding wheel 29 is mounted. Both the grinding wheel 29 and the table 22 are driven by the motor 37, through suitable arranged belts and gearing, as is well known to those skilled in the art.

The grinding wheel slide 28 is adjustable vertically of the post 27 by means of the hand wheel 30.

The viewer 40 comprises a substantially U-shaped supporting frame, broadly indicated by reference numeral 39, mounted on the table 22. The frame 39 has a central horizontal portion extending above and clear of the area between the workpiece centers 26 and 31 and the working edge of the grinding wheel 29.

The frame 39 comprises a main support 42 mounted on the table 22 through a base 41. The support 42 is joined to the base 41 through a dove-tailed cross-slide 43, having a cross-feed screw 44, an operating hand wheel 45, and a lock screw 38.

Reference numeral 49 indicates a channel iron rigidly mounted on the upper end 50 of the support 42 and forming a lateral extension thereof extending lengthwise of the table 22.

A beam splitter housing 52 is mounted on the end of the channel 49. A dove-tailed tongue 53 extends crosswise of the end wall of the housing 52.

Reference numeral 54 indicates a curved bracket, immovably bolted to the table 22 through a base 57. The bracket 54 has a dove-tailed mortise 55, extending crosswise the end thereof adapted to receive the tongue 53 of the housing 52. The so engaged elements may be locked against relative movement by a lock screw 56. Thus the housing 52 is rigidly held above the area between the workpiece holding centers 26 and 31, as seen in FIGURES 1 and 2.

The support 42 and the bracket arm 54 are angled toward the grinder post 27 so that the vertical axis of the housing 52 will normally pass through the center line of the workpiece holding centers 26 and 31. The housing 52 can be shifted cross-wise of the work centers 26 and 31 by loosening the lock screws 38 and 56 of the cross-slides 43 and 53, respectively. The releasing of the screw 56 leaves the tongue 53 free to slide in its mortise 55. The main support cross-slide 43 and its attached structure can then be moved cross-wise of the table 22, by rotation of the feed screw 44 through the hand wheel 45.

After positioning the housing 52, the supporting structure can be rigidly locked in place by tightening the screws 38 and 56.

The support base 41 is offset downwardly and rearwardly to define a step 46 positioned below and behind the top face of the table 22.

A lamp case 47 is mounted in a dependent position under the step 46. A projection lamp 81 is mounted in the case 47 and suitable condensing and heat absorption lenses 82 and 83 are mounted in the illumination tube 48.

Figure 8:
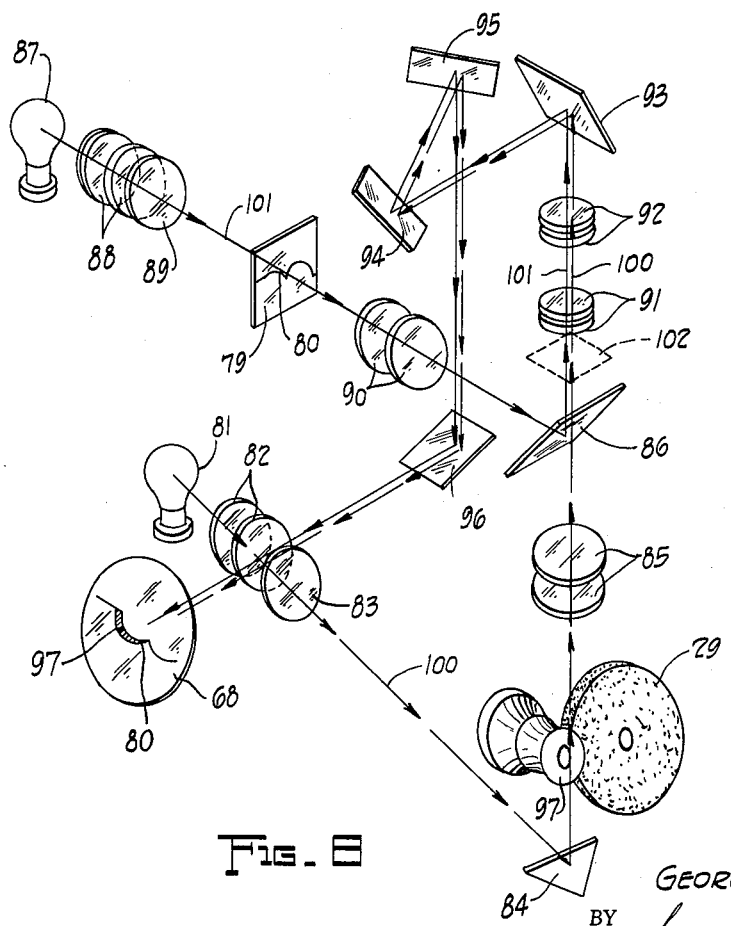
FIGURE 8 is a schematic layout of the optical system.

A plane mirror 84 is mounted on the rear side of the table 22 and positioned and angled so that the beam 100 from the light source 81 will be projected upward and across the meeting faces of the workpiece 97 and the grinding wheel 27, as illustrated in FIGURE 8.

A second lamp case 51 is mounted on the top end 50 of the support 42. A projection lamp 87 and associated condensing and heat absorbing lenses 88 and 89, respectively, are mounted therein. The case 51 is connected to the split beam housing 52 by light-tight tubes or conduits 59 and 60 connected through reticule case 58. The reticule case 58 has a slot 77 for receiving a specimen frame 71, which is intersected by the light opening 78.

Figure 7:
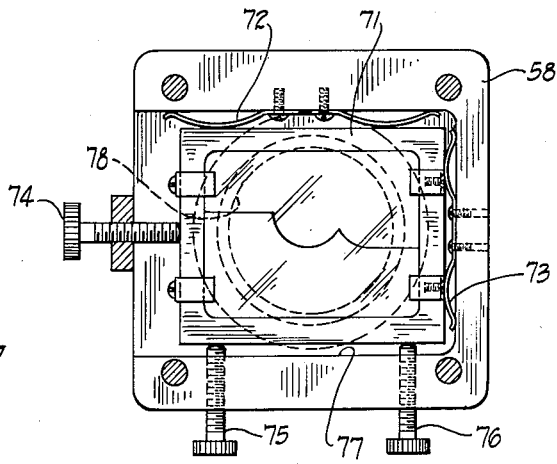
FIGURE 7 is a vertical view taken along the line and in the direction of the arrows 7—7 of FIGURE 3.

The outline of the countour to which the workpiece is to be shaped, at a 1:1 scale, is mounted in the frame 71. This outline may take the form of a thin section of an actual workpiece, or a template of the same size. A photograph of a section through the finished workpiece in the form of a transparency film 79 may also be used. The frame 71 is mounted in the reticule case slot 77 with two adjacent edges bearing against the leaf spring 72 and 73. Adjusting screws 74, 75 and 76, as seen most clearly in FIGURE 7, are then used to center the reference specimen outline 80. Reference numeral 61 indicates a lens tube mounted centrally of the lower face of the beam splitter housing 52. The workpiece objective lens 85 is mounted in the tube 61. A similar, specimen objective lens 90 is mounted in tube 60.

Reference numeral 86 indicates a semi-reflecting mirror, or beam splitter plate, mounted in the housing 52 at a 45° angle to the optical axes of both objectives 85 and 90. A scanner tube 64 is mounted through a ball and socket joint, 62—63, in the top of the housing 52. A combination scanning and projecting lens system 91—92 is mounted in the tube 64 with the nodal point of its lower component centered exactly at the center of rotation of the ball joint 62—63.

An image erecting box 65 is mounted on the top of the tube 64. Reference numerals 93, 94 and 95 indicate first surface reflecting mirrors angularly disposed within the box 65 and adapted to erect the image received from the projecting lengs system 91—92. The exact angular disposition of the several mirrors required to effect this can be easily determined by those skilled in optics, and forms no part of the invention.

A viewing screen housing 67 is connected to the image erecting box 65 through light ducts 69 and 70 joined at 90° to each other through a 45° angle case 66 containing the mirror 96.

The housing 67 has a ground glass screen 68 mounted at the front end thereof, upon which the superposed images of the workpiece, grinding wheel, and reference specimen are projected, as explained hereinafter, and as seen in FIGURE 1.

As stated hereinbefore, the primary purpose of this invention is to enable the operator of a cylindrical grinding machine to view the superposed images of a workpiece, as it is being shaped, and the outline of a reference specimen at a 1:1 scale, while simultaneously grinding the workpiece toward the reference contour.

In order to more easily explain how this is brought about, reference is made to FIGURE 8, wherein the schematic layout of the optical system is displayed without its supporting physical structure.

The focal lengths and diameters of the various lens components will vary, depending upon the size of the final image desired and the working distance between the various elements. This data can be easily computed by one skilled in the art and therefore no detailed optical specifications will be given here. Two beams of light are involved, the first broadly indicated by reference numeral 100, carries the workpiece image, and the second, broadly indicated by reference numeral 101, carries the reference image.

Beam 100 originates at the lamp 81, travels horizontally through condensing and heat absorbing lenses 82 and 83, respectively, and is then reflected by the mirror 84 at a 90° angle vertically, to illuminate the work-piece 97 and the working edge of the grinding wheel 29.

Beam 100 then passes through the objective lens 85 and straight through the beam splitter 86 to form an inverted real image of the workpiece in the air at the point 102, shown as a dotted line square. The image at 102 is then enlarged by the projecting lens system 91—92. The inverted and enlarged image of the workpiece carried by beam 100 is then reflected back and forth between the image erecting mirrors, 93, 94 and 95, to the viewer mirror 96 and on to the translucent viewing screen 68.

The second beam 101 originates at lamp 87, travels through condenser and heat absorbing lenses 88 and 89, respectively, to illuminate the master template or specimen 80. Specimen beam 101 then passes through objective lens 90 to the inclined face of the beam splitter 86, from which it is reflected upward at a 90° angle to form an inverted image of the specimen superposed on the workpiece image at the identical point 102, shown as a dotted line square, as explained hereinabove. The beam 101 then takes the same path as the beam 100, through the projecting lens system 91—92, the erecting mirrors 93, 94, 95, the viewer mirror 96, and on to the viewer screen 68, where the two enlarged images of the workpiece 97 and the reference specimen 80 appear superposed, as seen in FIGURES 1 and 8.

It will be noted that from the point 102, where the real images of the workpiece and specimen are first superposed, the two beams 100 and 101, respectively, follow identical paths and simultaneously travel through the same and single projector lens system 91—92.

Each of the objective lens 85 and 90 is made up of two elements. The magnification of the real images at 102 is controlled by varying the space between these elements, to obtain equal size images of the workpiece and specimen at point 102. This adjustment is necessary if objectives 85 and 90 do not have exactly the same focal length. In this setup distortion is then zero, because of symmetry.

Due to the fact that the projector lens system 91—92 is tiltable at one of its nodal points by reason of the nodal point being mounted at the exact center of the ball joint 63 of the lens tube 64, the projector lens may be tilted 15° either way from the verticle to scan the superposed real images at point 102.

These alternate scanning positions of the projection lens and associated structure are indicated by reference numerals 65a and 65b in FIGURE 1.

By pivoting the projection lens at a nodal point, focus is maintained as the real images at 102 are scanned. The resultant enlarged superposed images projected on the viewing screen 68 thus remain sharp, even though the projection lens 91—92 scans over a 15° arc, to either side of its vertical optical axis.

This scanning feature provides a smaller and more compact unit 40 than would be required to provide an adequately large viewing image, if the screen 68 had to accommodate the entire enlargement of image 102 at one time. Again, the overall length of the optical system is considerably shortened, due to the fact that the screen 68 does not have to be backed off from the projection lens far enough to show the entire enlarged picture at one time.

To set up the machine for continuous visual inspection, the workpiece 97 is mounted between the centers 26 and 31, as seen in FIGURE 1 with the longitudinal center of the workpiece approximately in line with the workpiece objective lens tube 61. The grinding wheel 29 is then brought into contact with the edge of the workpiece 97 at the point at which grinding is to start.

The lock screw 56 of cross-slide tongue 53 is loosened and the lock screw 38 of cross-slide 43 is also loosened.

The upright 42 of U frame 39 is then free to be moved crosswise of the table 22 by rotating the screw 44. The upright 42 is adjusted to bring the optical center of the workpiece objective 85 in tube 61 into line with the contact point between the workpiece 97 and the grinding wheel 29, as is seen most clearly in FIGURE 2. At the same time the mirror 84 is adjusted to throw the light beam 100 from lamp 81 upward, to illuminate the workpiece 97 in the line of the optical center of the objective lens 85. After this is done the lock screws 38 and 56 of the cross-slides 43 and 53, respectively, are tightened to restore the rigid and immovable supporting frame 39 for the optical scanning and viewing components. With the workpiece objective lens 85 so centered on the workpiece, the superposed images of the specimen 80 and the workpiece 97 are plainly visible on the viewing screen 68.

Any departure from coincidence between the edge of the workpiece and the contour of the specimen is clearly visible. The grinding operation is continually viewed as the workpiece is shaped by the wheel. The grinding operation can be stopped at any time and comparison between the outline of the image of the workpiece and specimen can be instantly made, without removing the workpiece from its supporting centers 26 and 31.

As described hereinabove, the real image at 102 of the workpiece and specimen can be scanned by the projection lens 91—92 over an arc of approximately 15° from the verticle, so that the workpiece objective lens 85 need not be moved as the grinding wheel 29 is moved longitudinally of the workpiece 97 to shape a contour molding to that of the specimen image.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a cylindrical grinding machine of the type having a grinding wheel, a table, and workpiece holding centers mounted on the table and movable therewith relative to the grinding wheel; an optical comparator, comprising, a frame member rigidly mounted on the table and extending above the area between the workpiece holding centers and the grinding wheel; a light-tight housing mounted on the frame above the workpiece holding centers; a vertically extending projection lens system holding tube pivotally mounted through the top of the housing, at a nodal point of the projection lens system; a viewing screen mounted on the projection lens holding tube through a light-tight conduit, including an image erecting system; a downwardly extending first objective lens holding tube mounted through the bottom wall of the housing in vertical alignment with the projection lens tube; a horizontally extending second objective lens holding tube, mounted through one side wall of the housing; a beam splitter mirror, mounted within the housing at an inclination of 45° to the vertical, with its upper reflecting surface faced toward the second objective, the optical axes of the first and second objectives and the projection lens being substantially perpendicular to the horizontal axis of the mirror; a reference specimen holding reticule mounted on the frame in optical alignment with the second objective and connected therewith through a light-tight conduit; means mounted on the frame for illuminating the reticule and workpiece; and means on the frame for cross-feeding the housing relative to the table so that the optical axis of the first objective may be aligned with the formed edge of a workpiece, held between the table centers, as it is operated upon by the grinding wheel; the focal lengths of the first and second objectives being such that they will form superposed real aerial images of the reference specimen and workpiece, at a scale 1:1, within the housing, in the focal plane of the projection lens; while the focal length of the projection lens is such that it will project an enlarged image of the superposed aerial images on to the viewing screen, the projection lens system being tiltable to scan the aerial image.

2. A structure as defined in claim 1, and further distinguished by the projection lens system holding tube being mounted on the housing through a ball and socket joint, with a nodal point of the projections lens system positioned at the center of the ball.

3. An optical comparator, comprising in combination, a table having a workpiece holding fixture positioned thereon; a frame member rigidly mounted on the table and extending over and above the fixture; a light-tight housing mounted on the frame, above the fixture; a vertically extending projection lens system holding tube pivotally mounted through the top of the housing with its pivot point at a nodal point of the projection lens system; a viewing screen mounted on the upper end of the projection lens holding tube through a light-tight conduit, including an image erecting system; a downwardly extending first objective lens holding tube mounted through the bottom of the housing in substantial vertical alignment with the projection lens tube; a horizontally extending second objective lens holding tube mounted through one side wall of the housing; a beam splitter mirror, mounted within the housing at an inclination of 45° to the vertical, with its upper reflecting surface faced toward the second objective; the optical axes of the first and second objectives and the projection lens being substantially perpendicular to the horizontal axis of the beam splitter mirror; a reference specimen holding reticule mounted on the frame in optical alignment with the second objective and connected therewith through a light-tight conduit; a reference specimen held in the reticule, means mounted on the frame for illuminating the reticule and a workpiece held in the fixture; and means on the frame for cross-feeding the housing relative to the table so that the optical axis of the first objective may be aligned with the formed edge of the held workpiece; the focal lengths of the several objectives being such that they will form superposed real aerial images of the reference specimen and workpiece, at a scale 1:1, within the housing, in the focal plane of the projection lens; while the focal length of the projection lens is such that it will project an enlarged image of the superposed aerial images on the viewing screen; the projection lens system being tiltable to scan the aerial image.

4. A structure as defined in claim 3, and further distinguished by the projection lens system holding tube being mounted on the housing through a ball and socket joint, with a nodal point of the projection lens system positioned at the center of the ball.

5. In combination with a cylindrical grinding machine of the type having a grinding wheel, a table, and, workpiece holding centers mounted on the table and movable therewith relative to the grinding wheel; comprising, a semi-reflecting mirror inclined to the horizontal plane, mounted on the table above the workpiece holding centers, an image viewing screen mounted in optical alignment with the mirror to receive light both reflected and transmitted through the mirror, a projection lens tiltably mounted, at a nodal point, between the screen and mirror with its optical substantially perpendicular to the horizontal axis of the mirror; a first real image forming means having an objective arranged below the mirror with its axis substantially perpendicular to the horizontal axis of the semi-reflecting mirror to project a first real image of a workpiece held between said centers through the mirror to form a first real image in the focal plane of the projection lens; a second real image forming means having an objective arranged with its axis substantially perpendicular to the vertical axis of the mirror and arranged to form a second real image of a reference specimen, at a scale 1:1 with reference to the workpiece, in the focal plane of the projection lens, after reflection from the front face of the mirror, the said second real image being superposed upon the first real image, means for focusing said projection lens on the superposed aerial images to project an enlargement of same on to the viewing screen, and means for tilting the projection lens to scan the superposed aerial images of the reference specimen and workpiece.

References Cited in the file of this patent

UNITED STATES PATENTS

| | | |
|---|---|---|
| 2,485,355 | Brennan | Oct. 18, 1949 |
| 2,845,756 | Papke | Aug. 5, 1958 |